United States Patent Office 3,475,413
Patented Oct. 28, 1969

3,475,413
PROCESS FOR THE PREPARATION OF HEXOSE-1,6- AND PENTOSE-1,5-DIPHOSPHATE
Michael Nelboeck-Hochstetter and Erich Haid, Tutzing, Germany, assignors to C. F. Boehringer & Soehne G.m.b.H., Mannheim-Waldhof, Germany
No Drawing. Filed June 12, 1967, Ser. No. 645,480
Claims priority, application Germany, June 15, 1966, B 87,574
Int. Cl. C07f 9/00
U.S. Cl. 260—234         10 Claims

ABSTRACT OF THE DISCLOSURE

A process for the preparation of hexose-1,6- and pentose-1,5-diphosphate is disclosed wherein a hexose-6-monophosphate or a pentose-5-monophosphate is reacted with an acylation agent, the excess acylation agent removed, the residue melted, while gently warming, with an excess of anhydrous ortho- and/or pyrophosphoric acid and the resultant reaction product mixed with alkali to produce the desired diphosphate. Hexose-1,6- and pentose-1,5-diphosphate are useful as pharmaceuticals and as reagents in biochemical and clinical-chemical laboratories.

---

The present invention relates to a process for the chemical synthesis of hexose-1,6- and pentose-1,5-diphosphate. More particularly, the present invention relates to a simple "one pot" process for the preparation of hexose-1,6- and pentose-1,5-diphosphates from the corresponding hexose-6- and pentose-5-phosphates.

Monosaccharides which are esterified with phosphoric acid on both ends of the carbon chain play an important part as co-enzymes in physiological phosphate transfer. Because of this property, the monosaccharides are today important reagents in biochemical and clinical-chemical laboratories.

Thus, for example, glucose-1,6-diphosphate is the co-enzyme of phosphogluccomutase, which catalyzes the reaction:

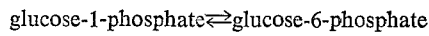
glucose-1-phosphate⇌glucose-6-phosphate and ribose-1,5-diphosphate is the co-enzyme of phosphoribomutase, which catalyzes the reaction:

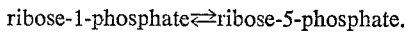
ribose-1-phosphate⇌ribose-5-phosphate.

Heretofore, these sugar diphosphates were only obtainable by complicated chemical syntheses or by laborious isolation processes from biological materials.

Thus, the chemical synthesis of glucose-1,6-diphosphate described by T. Posternak (J. Biol. Chem., 180, 1269/1949), which involves a complicated seven-stage process, resulted, in spite of the laborious procedure, in yields of at the most 10%, referred to the acetyl-glucose-6-diphenyl phosphate used. The yields obtained were even lower when referred to the starting material as used in the process of the present invention.

The isolation of glucose-1,6-diphosphate from yeast extract, described by L. S. Leloir and A. C. Paladini in S. P. Colowick and N. C. Kaplan's "Methods in Enzymology" (pub. Academic Press Inc., New York, vol. III/1957, page 143 et seq.), also resulted in only very low yields of a product which was, in addition, highly impure so that technical production by this process was not possible.

Accordingly, it is an object of the present invention to provide a simple and efficient process for the preparation of hexose-1,6- and pentose-1,5-diphosphate.

An additional object is to provide a process for the preparation of hexose-1,6- and pentose-1,5-diphosphate suitable for technical production.

Still another object of the invention is to provide a process for the preparation of hexose-1,6- and pentose-1,5-diphosphate from hexose-6-mono-phosphate or pentose-5-monophosphate.

Still further objects and the entire scope of applicability of the present invention will become apparent from the detailed description given hereinafter.

In accordance with the invention, it has now surprisingly been found that hexose-1,6- and pentose-1,5-diphosphates are obtained by reacting a hexose-6-mono-phosphate or a pentose-5-monophosphate with an acylation agent, the excess acylation agent removed, the residue melted with gentle warming with an excess of anhydrous ortho- and/or pyrophosphoric acid, the reaction product mixed with alkali and the desired diphosphate thus produced recovered.

This simple process according to the present invention results in yields of the desired diphosphates amounting to 50% and more.

It is already known that non-phosphorylated, peracetylated glucose can be converted into the monophosphate by melt condensation with phosphoric acid (see D. L. McDonald, J. Org. Chem., 27, 1107/1962). However, it is surprising that sugars which are already phosphorylated in the 5- or 6-position give rise, after acylation, to the desired 1,6- and 1,5-diphosphates by condensation with anhydrous ortho- and/or pyrophosphoric acid since, as is known, the phosphorylated and non-phosphorylated sugars differ considerably in their reactivity. In view of the work of Ukita et al. (J. Biol. Chem., 216, 867 et seq./1955) showing that phosphate esters of sugars (glycerophosphate) acylated on the phosphate form cyclic phosphate esters in the case of alkaline hydrolysis, it was to have been expected that cyclic phosphate or fission products thereof, in which a phosphate group had migrated to a neighboring carbon atom, would be formed, as in the process according to the present invention, esters acylated on the phosphate group are formed as intermediate products, the same thereafter being subjected to an alkaline hydrolysis.

Furthermore, it was known that the stability of substituents on the $C_1$ atom of sugars is substantially increased by a phosphate group on the primary terminal alcoholic hydroxyl group so that it was to have been assumed that the exchange of an acyl group for a phosphate group on the $C_1$ atom of the sugar would be impaired by the phosphate ester group in the 5- or 6-position.

A particularly advantageous feature of the process according to the present invention is that the desired diphosphates can be obtained from the corresponding hexose-6- and pentose-5-monophosphates in a "one pot" process, without isolation of the intermediate products.

As examples of sugar monophosphates which can be used as starting materials in the process according to the present invention, there may be mentioned glucose-6-phosphate, arabinose-5-phosphate, galactose-6-phosphate, mannose-6-phosphate, ribose-5-phosphate and xylose-5-phosphate. Particularly good results have been obtained employing glucose-6-phosphate as starting material.

In the first stage of the "one pot" process according to the present invention, the sugar monophosphate is reacted with an acylation agent. As acylation agents, there are suitable the derivatives of $C_1$–$C_4$ fatty acids which are conventionally employed in reactions of this type, the preferred acylation agents being acetic anhydride and acetyl chloride. The acylation can be carried out without the use of a special solvent by employing an excess of the liquid acylation agent. Alternatively if desired, an inert solvent can also be employed.

The acylation reaction is preferably carried out in the presence of a condensation catalyst, as for example, zinc chloride, perchloric acid, pyridine or sodium acetate. Particularly good results have been obtained using anhydrous sodium acetate as condensation catalyst, when acetic anhydride is employed as the acylation agent.

The acylation is preferably carried out at a temperature between about 0° C. and 120° C., the temperature depending upon the presence and nature of the condensation catalyst.

Improved yields are generally obtained when a condensation catalyst is employed than when such a catalyst is not used. On the other hand, when a condensation catalyst is not employed, the necessity of having to remove it before the addition of the phosphoric acid is avoided.

When the acylation has been completed, excess acylation agent, reaction by-products and solvents and/or catalysts, if the same have been used, are removed, preferably by vacuum distillation at temperatures below 100° C., and most preferably at temperatures about 40° C. to 80° C.

It is to be assumed that in the reaction with the acylation agent, all of the free hydroxyl groups in the starting materials are acylated.

In the second stage of the process according to the present invention, the residue remaining after the removal of the excess acylation agent is mixed, preferably under vacuum, with an excess of anhydrous orthophosphoric acid or pyrophosphoric acid or a mixture thereof. The molar ratio of acylated sugar monophosphate to the ortho- and/or pyrophosphoric acid can amount to between about 1.5 and 10, preferably about 3 to 5 mol being used. If the molar excess of phosphoric acid is too low, then the yield is reduced while if the excess is too high, this complicates the purification of the diphosphates and has a disturbing effect on the subsequent saponification.

The reaction with the phosphoric acid is initiated by warming the reaction mixture to a temperature of more than 50° C., the phosphoric acid thereby melting and the mixture becoming homogeneous. The temperature suitable for the further reaction of the homogeneous mixture is between about 20° C. and 100° C., temperatures of about 50° C. to about 80° C. being particularly preferred.

The period required for the reaction is between a few minutes and several hours, depending upon the selected reaction temperature. In the case of the use of temperatures in the preferred range, the reaction takes about 1 to 2 hours.

After termination of the reaction, the reaction mixture is rendered alkaline by the addition of an strong alkaline agent, preferably of an aqueous or alcoholic lye. Alcoholic solutions of sodium hydroxide or potassium hydroxide have proved to be particularly suitable but other solvents can be used, such as tetrahydrofuran dioxane or morpholine, as well as other alkalis, such as ammonia or lithium hydroxide. It is most preferred however to use a methanolic solution of sodium hydroxide.

An advantage of using alcoholic lyes is that the corresponding salts of the sugar diphosphoric acids and of the ortho- and/or pyrophosphoric acids precipitate out. They can then be easily separated off in the conventional manner, for example, by filtration or centrifuging, and further purified.

According to the preferred feature of the present invention, this purification can be carried out in an especially simple manner by dissolving the precipitated salts in hot water and adjusting the pH of the solution to exactly 9.0. Upon cooling to about 0° C., the major portion of the orthophosphate crystallizes out as the dodecahydrate. The remainder can be removed, for example, in the form of magnesium ammonium phosphate. The sugar diphosphate can then be separated from the residual impurities, for example as the cyclohexylammonium salt, and crystallized.

According to a particularly preferred feature of the present invention, in the case of glucose phosphates, the separation of the diphosphate from the monophosphate can be accomplished by bringing to the boil a solution of the salts at an approximately neutral pH, preferably at a pH of 7.5, followed by admixture with a solution of a barium salt. Glucose-1,6-diphosphate is thereby completely precipitated out in the form of the dibarium salt, whereas, surprisingly, under these conditions, unreacted glucose-6-phosphate remains almost completely in solution. This behavior is most surprising since the barium salt of glucose-6-phosphate is insoluble in the cold and, in general, the alkaline earth metal salts of sugar phosphates are insoluble at elevated temperatures.

According to the present invention, a separation of glucose-1,6-diphosphate from other accompanying impurities can take place by careful acidification with hydrochloric acid to a pH of 4. The diphosphate thereby goes into solution and can be separated from the impurities which remain undissolved.

The process according to the present invention proceeds sterospecifically and with good yields and thus makes hexose-1,6- and pentose-1,5-diphosphates available for the first time under economically feasible conditions. The fact that, in the process according to the present invention, the biologically effective α-configuration is always formed, is especially important. This is particularly surprising since this effect occurs independently of the condensation catalyst used and, as is known, the various condensation catalysts form either the α- or β-form.

The following examples are given for the purpose of illustrating the present invention and are in nowise to be construed as limitative thereof.

EXAMPLE 1

Preparation of glucose-1,6-diphosphate 522 g. (1 mol) of crystalline barium α-D(+)-glucopyranose-6-phosphate heptahydrate were suspended in 2 litres distilled water, stirred for 20 minutes in an ice bath with 55.5 ml. (1 mol) concentrated sulfuric acid (which had been previously diluted with water) and then filtered off from the barium sulfate formed. The precepitate was washed once with water. The combined filtrates contained about 95% by weight of the glucose-6-phosphate initially used, as the free acid.

The pH of the solution of the glucose-6-phosphate was adjusted to 4 with pyridine, placed in a round-bottomed 2 litre flask and evaporated to dryness in a vacuum. In order to remove the residual water, the residue was twice taken up in pyridine and evaporated to dryness. The resulting glassy, semi-solid residue was suspended in 1,500 ml. pyridine, 1,500 ml. acetic anhydride were then added and the mixture was shaken for about 15 hours. The residue thereby went into solution with a slight evolution of heat. The reaction mixture was again evaporated to dryness at a pressure of about 5 mm. Hg, the residue taken up in about 200 ml. acetic anhydride and again evaporated. Towards the end of the distillation, the bath temperature was increased to 75° C. The pyridine, acetic acid and acetic anhydride present were thereby removed.

The glassy, brown residue was mixed with 392 g. crystalline orthophosphoric acid (4 mols) which has been rendered anhydrous by drying over magnesium perchlorate. The 2 litre round-bottomed flask which was used as the reaction vessel was attached to a rotary evaporator and a vacuum of 1–5 mm. Hg applied thereto via a suitable cold trap. Under exclusion of moisture and by heating to 70–75° C., the reaction was initiated by rotation of the reaction vessel in a warm bath. The phosphoric acid melted at about 50° C. and the mixture became homogeneous. After about 90 minutes, the evolution of gas had ceased and the reaction was completed. After cooling, the reaction mixture was taken up in about 5 litres methanol at ambient temperature and adjusted to a pH of 9–10 with about 700 ml. 30% sodium hydroxide solution.

After about 5 minutes, the supernatant methanol was decanted off from the precipitate formed and discarded.

The remaining residue was dissolved in about 1.5 litres of hot water, adjusted to pH 9.0 with either acetic acid or sodium hydroxide solution, as appropriate, and then cooled to about 0° C. The crystalline precipitate which had formed was filtered off with suction and washed with a little cold water.

The residual orthophosphate in the filtrate was stoichiometrically crystallized as magnesium ammonium phosphate and filtered off with suction.

The filtrate, freed from inorganic phosphate, was brought to the boil and mixed, at pH 7.5, with 750 ml. 50% barium acetate solution. A filtrate was thusly formed which was filtered off hot and thereafter washed twice with hot water. The precipitate was then suspended in about 2 litres of water, adjusted to a pH of 4 at ambient temperature by the careful addition of hydrochloric acid, separated from insoluble matter and completely decolorized by the addition of charcoal and subsequent filtration.

The clear, water-white filtrate was adjusted to a pH 7.5 with sodium hydroxide solution, the greater part of the glucose-1,6-diphosphate barium salt thereby being precipitated out. It was briefly heated to the boiling point, again filtered while hot, washed with alcohol and then with acetone and the precipitate thereafter dried in a vacuum, first over calcium chloride and finally over phosphorus pentoxide. The yield of the dibarium salt of glucose-1,6-diphosphate amounted to about 210 g.

EXAMPLE 2

Preparation of glucose-1,6-diphosphate 335 g. sodium glucose-6-phosphate, 125 g. anhydrous sodium acetate and 1.7 litres acetic anhydride were introduced into a 3 litre three-necked flask. Under reflux and with continuous stirring, the flask which had been placed in an oil bath at a temperature of 105° C., was brought to an internal temperature of 95° C. At 95° C., a marked increase in the temperature occurred so that cooling was necessary. After 1.5 hours, the flask was cooled down to 0° C. and the sodium acetate which crystallized out filtered off. The remaining filtrate was evaporated to dryness.

The further working up was carried out as described in Example 1 except that the heating with the phosphoric acid was carried out at 80–85° C.

The yield of the dibarium salt of glucose-1,6-diphosphate amounted to 250 g.

EXAMPLE 3

Preparation of glucose-1,6-diphosphate in the absence of a catalyst

The process described in Example 2 was repeated except that the sodium acetate was omitted. Consequently, the filtration step for the subsequent removal of the sodium acetate was unnecssary and the contents of the flask could be directly evaported to dryness.

The yield of the dibarium salt of glucose-1,6-diphosphate amounted to 190 g.

EXAMPLE 4

Preparation of galactose-1,6-diphosphate 320 g. completely anhydrous, approximately 95% sodium galactose-6-phosphate were suspended in 1.7 litres acetic anhydride in a 3 litre three-necked flask. Under reflux and with continuous stirring, the flask was heated in an oil bath, to an internal temperature of about 110° C. A marked increase of temperature took place at 100–110° C. After about 1 hour, the reaction had been completed. The reaction mixture was cooled to ambient temperature and about 3–4 times its volume of ether added thereto. Upon cooling to −10° C., sodium acetate crystallized out.

The crystals were filtered off with suction and the filtrate evaporated to dryness in a vacuum.

The further working up was carried out as described in Example 1 except that about 50% more phosphoric acid was used for the phosphate melt reaction and, thereafter, a correspondingly increased amount of sodium hydroxide solution was added.

The yield of the dibarium salt of galactose-1,6-diphosphate amounted to about 180–200 g.

EXAMPLE 5

Preparation of ribose-1,5-diphosphate 365.4 g. (1 mol) barium ribofuranose-5-phosphate were suspended in 2 litres distilled water, stirred with 55.5 ml. (1 mol) concentrated sulfuric acid (which had been previously diluted with water) for 20 minutes in an ice bath and then filtered off from barium sulfate formed. The precipitate was washed once with water. The combined filtrates contained about 95% by weight of the ribose-5-phosphate initially used, as the free acid.

The pH of the solution was adjusted to 6–6.5 with sodium hydroxide solution, then placed in a round-bottomed flask and evaporated to dryness in a vacuum. For the removal of residual water, glacial acetic acid was added twice to the residue and each time evaporated to dryness. The resultant glassy, semi-solid residue was reacted with 2,500 ml. acetic anhydride at a temperature of about 80° C., under reflux and with stirring, and the temperature slowly increased to 105° C. The residue thereby went into solution, with the evolution of a small amount of heat. The reaction mixture was then concentrated at a pressure of about 5 mm. Hg to about 1,500 ml., cooled to ambient temperature and mixed with about 3 to 4 times its volume of ether, under thorough stirring. Upon cooling to about −10° C., the major portion of the sodium acetate crystallized out. After separation of the precipitate, the clear solution was evaporated to dryness in a vacuum.

The glassy, brown residue was mixed with 392 g. (4 mols) crystalline orthophosphoric acid which has previously been rendered anhydrous by drying over magnesium perchlorate.

The 2 litre round-bottomed flask used as the reaction vessel was attached to a rotary evaporator and a vacuum of about 1 mm. Hg applied thereto via a suitable cold trap. Under exclusion of moisture and by heating to about 55° C., the reaction was initiated by rotation of the reaction vessel in a warm bath. The mixture slowly became homogeneous and after about 60 minutes, the evolution of gas had ceased and the reaction was finished. After cooling to ambient temperature, the reaction mixture was introduced, with cooling and stirring, into 4,200 ml. of a 5% solution of sodium hydroxide, whereby the final pH amounted to about 9–10.

By the addition of either phosphoric acid or of sodium hydroxide solution, the pH of the solution was then adjusted to exactly 9 and evaporated under vacuum in a rotary evaporator. Upon the appearance of the first crystallizate, the solution was allowed to stand overnight at 0° C. The major portion of the excess inorganic phosphate crystallized out as disodium hydrogen phosphate dodecahydrate. After separation of the crystalline precipitate, the clear filtrate remaining was again concentrated until a crystallizate again appeared and the crystallization of the sodium phosphate was repeated in the manner described above.

The residual orthophosphate in the final solution (about 700 ml.) was crystallized out as magnesium ammonium phosphate and filtered off with suction.

The inorganic phosphate-free filtrate was then mixed at the boiling point and at a pH of 7.5 with about 750 ml. of a 50% barium acetate solution. A precipitate was thereby formed which was filtered off hot and thereafter washed twice with hot water. The precipitate as then suspended in about 2 litres water, adjusted to a pH of 4 at ambient temperature by careful acidification with hydrochloric acid, the insoluble material separated off and the filtrate completely decolorized by the addition of charcoal and the subsequent filtering off thereof.

The clear, water-white filtrate was then adjusted to a pH of 7.5 by the addition of a solution of sodium hydroxide, the greater part of the ribose-1,5-diphosphate thereby being precipitated out in the form of its barium salt. After briefly heating to the boil, it was again hot filtered, washed free of chloride with hot water and thereafter washed first with alcohol and then with acetone and the precipitate dried in a vacuum, first over anhydrous calcium chloride and finally over phosphorus pentoxide.

The yield of the dibarium salt of ribose-1,5-diphosphate amounted to about 120 g.

In a similar manner other hexose-1,6 and pentose-1,5-diphosphates have been obtained, e.g. mannose-1,6-diphosphate from mannose-6-phosphate.

Among other suitable acylation agents there may be named acetyl bromide, acetic acid anhydride, propionyl bromide, propionyl chloride, propionic acid anhydride, butyryl chloride, butyryl bromide and ketene. Advantageously the acylation agent is employed in a considerable excess, preferably in an excess of about 4 to about 12 molar equivalents.

We claim:
1. Process for the preparation of hexose-1,6- and pentose-1,5-diphosphates which comprises reacting a hexose-6-monophosphate or a pentose-5-monophosphate with an excess of an acylation agent, removing excess acylation agent, forming a melt of the resultant residue with gentle warming and reacting the acylated monophosphate product contained therein with an excess of ortho- and/or pyrophosphoric acid, adding to the reaction product thereby formed an alkyline lye and recovering the diphosphate thus produced from the alkaline hydrolysis mixture.

2. Processing according to claim 1 wherein said acylation agent is a reactive derivative of a $C_1$–$C_4$ fatty acid.

3. Process according to claim 1 wherein said acylation reaction is carried out in the presence of a condensation catalyst selected from the group consisting of zinc chloride, perchloric acid, pyridine and sodium acetate.

4. Process according to claim 1 wherein said acylation reaction is carried out with acetic anhydride and anhydrous sodium acetate as acylation agent.

5. Process according to claim 1 wherein said acylation reaction is carried out at a temperature of between about 0° C. and 120° C.

6. Process according to claim 1 wherein said ortho- and/or pyrophosphoric acid is employed in a molar ratio of acylated monophosphate to ortho- and/or pyrophosphoric acid of between about 1.5 and 10.

7. Process according to claim 1 wherein said reaction with said phosphoric acid is initiated by heating to a temperature above 50° C.

8. Process according to claim 1 wherein said alkaline lye is a member selected from the group consisting of lithium hydroxide, sodium hydroxide, potassium hydroxide and ammonia and is employed in the form of its aqueous or alcoholic solution.

9. Process according to claim 1 comprising the additional steps of dissolving the reaction product produced in the treatment with strong alkaline agent in hot water, adjusting the pH of the resulting solution to a value of exactly 9 and cooling to about 0° C. whereby the inorganic phosphate present crystallizes out.

10. Process according to claim 1 wherein said monophosphate is a member selected from the group consisting of glucose-6-phosphate, arabinose-5-phosphate, galactose-6-phosphate, mannose-6-phosphate, ribose - 5 - phosphate and xylose-5-phosphate.

References Cited

UNITED STATES PATENTS 3,201,389  8/1965  Fujimoto et al. _____ 260—211.5

FOREIGN PATENTS

6763/63  5/1963  Japan.

OTHER REFERENCES

Neuberg et al., "Reprint from Archives of Biochemistry," vol. 3, No. 1, October 1943, pp. 33–37.

Tener et al., "Jour. Amer. Chem. Soc.," vol. 80, No. 8, Apr. 20, 1958, pp. 1999–2002.

LEWIS GOTTS, Primary Examiner

J. R. BROWN, Assistant Examiner